United States Patent [19]
Nakano et al.

[11] Patent Number: 5,676,618
[45] Date of Patent: Oct. 14, 1997

[54] TRANSMISSION HAVING A FRICTION-ROLLER-TYPE CONTINUOUSLY VARIABLE TRANSMISSION SUBASSEMBLY AND SEPARATE EXTERNALLY CONNECTED CONTROL PISTONS

[75] Inventors: Masaki Nakano, Yokohama; Katsuya Kobayashi, Yokosuka, both of Japan

[73] Assignee: Nissan Motor Co., Ltd., Yokohama, Japan

[21] Appl. No.: 355,317

[22] Filed: Dec. 12, 1994

[30] Foreign Application Priority Data

Dec. 17, 1993 [JP] Japan .................... 5-318422

[51] Int. Cl.$^6$ .................................................. F16H 15/38
[52] U.S. Cl. ........................... 476/10; 476/40; 476/46
[58] Field of Search ........................... 476/10, 40, 46

[56] References Cited

U.S. PATENT DOCUMENTS

| | | | |
|---|---|---|---|
| 1,986,264 | 1/1935 | Hayes | 476/40 |
| 2,097,633 | 11/1937 | Madle | 476/40 |
| 2,123,006 | 7/1938 | Hayes | 476/46 |
| 3,810,398 | 5/1974 | Kraus | 74/200 |
| 4,974,466 | 12/1990 | Kraus et al. | 476/40 |
| 5,020,384 | 6/1991 | Kraus | 476/46 |
| 5,048,359 | 9/1991 | Nakano | 476/46 |
| 5,085,089 | 2/1992 | Kraus | 476/40 |
| 5,261,863 | 11/1993 | Jufuku et al. | 476/46 |
| 5,417,620 | 5/1995 | Lohr et al. | 476/46 |

FOREIGN PATENT DOCUMENTS 0 413 342 A1  8/1990  European Pat. Off. .
374667       8/1989  Japan .
4-321855     11/1992 Japan .

Primary Examiner—Charles A. Marmor
Assistant Examiner—David M. Fenstermacher
Attorney, Agent, or Firm—Foley & Lardner

[57] ABSTRACT

A continuously variable transmission comprises a transmission unit and a casing. The transmission unit includes input and output disks on a main shaft and friction rollers arranged around axes of the disks and supported by trunnions. For controlling the speed ratio of the disks, the trunnions are urged by pistons and moved synchronously along own swinging axes perpendicular to the rotating axes of the friction rollers. Neighboring ends of the trunnions are mutually connected by linkage members and pivotally supported by the casing. The pistons can be fitted into the casing 1 from the outer side thereof, and can be detachably connected to the trunnions in the casing. The transmission is provided with a linkage support member, which can be inserted in the casing from an end opening thereof and fixed thereto perpendicular to an axis of the casing. When assembling the transmission, the main shaft is passed through a penetrating hole of the linkage support member, and the linkage members are pivotally supported by the linkage support member. Then, the disks are tightened in mutually closing directions, forming a sub-assembly of the transmission unit 5 without the pistons. Then, the subassembly is inserted in the casing from the end opening thereof and fixed to the casing perpendicularly thereto, while the pistons are fitted into the casing from the outer side thereof and connected to the trunnions of the subassembly in the casing respectively.

5 Claims, 7 Drawing Sheets

TRANSMISSION HAVING A FRICTION-ROLLER-TYPE CONTINUOUSLY VARIABLE TRANSMISSION SUBASSEMBLY AND SEPARATE EXTERNALLY CONNECTED CONTROL PISTONS

BACKGROUND OF THE INVENTION

1. Field of the Present Invention

The present invention relates generally to a continuously variable transmission of friction-roller-type for automobiles or the like, and more specifically to such a transmission having improved assembling workability.

2. Description of the Related Art

A friction-roller-type continuously variable transmission for automobiles or the like is known, for example, from JP-A-4-321,855. The known friction-roller-type continuously variable transmission generally comprises a transmission unit and a transmission casing containing the transmission unit. The transmission unit includes an input disk and an output disk opposed to each other on a main shaft. A plurality of friction rollers are arranged around a common rotating axis of the input and output disks and are rotatably supported by roller support members so that the friction rollers transmit power between the disks to which the friction rollers are frictionally engaged.

In the known friction-roller-type continuously variable transmission, for controlling a speed ratio of the input and output disks, the roller support members are respectively urged by pistons and moved synchronously along their own swinging axes, each of which is perpendicular to a rotating axis of corresponding friction roller, to cause synchronous swings of the friction rollers, resulting in change of the speed ratio. To ensure the synchronous movement of the roller support members, neighboring ends of the roller support members are connected to each other by linkage members, a central part of each of which is pivotally supported by the transmission casing.

The known friction-roller-type continuously variable transmission, however, has to depend on an assembling sequence where the main shaft and the input and output disks, which are arranged to extend in the same direction as an axis of the transmission casing, are inserted from an end opening of the transmission casing, while the friction rollers and the roller support members and the linkage members, which extend across the axis of the transmission casing, are inserted from a lower opening of the transmission casing. The lower opening is provided with a space for containing speed ratio change control valves. Then, these inserted parts are assembled in the transmission casing. Combined with the fact that there is only an extremely narrow working space in the transmission casing, assembling workability of transmission is remarkably low, and automation of transmission assembly is difficult.

Further, in the known friction-roller-type continuously variable transmission, since linkage support members for supporting each of the linkage members on the transmission casing are separated and consist of independent parts, it is difficult to secure the linkage support members with sufficient strengths, so that when the linkage support members receive great degree of moment for speed ratio change, the linkage support members deform, detrimentally affecting the speed ratio change control accuracy.

As a countermeasure to solve the problem with respect to such strengths of the linkage support members, it has been previously proposed to unite the linkage support members, as described for example in JP-A 3-74,667. But this proposal cannot solve the workability problem associated with assembling the transmission.

SUMMARY OF THE INVENTION

It is therefore an object of the present invention to provide a friction-roller-type continuously variable transmission that not only solves the problems associated with the strengths of the linkage support members, but one that also enables insertion of a subassembly of the transmission unit in the transmission casing, in a direction along an axis of the transmission casing and from an end opening of the transmission casing.

To this end, according to the present invention, a friction-roller-type continuously variable transmission comprises a continuously variable transmission unit and a transmission casing containing the transmission unit. The transmission unit includes an input disk and an output disk opposed to each other on a main shaft. A plurality of friction rollers are arranged around a common rotating axis of the input and output disks and rotatably supported by roller support members respectively so that the friction rollers transmit power between the disks to which the friction rollers are frictionally engaged. The roller support members are urged by pistons respectively and moved synchronously along their own swinging axes. Each of the axes is perpendicular to a rotating axis of corresponding friction roller to cause synchronous swings of the friction rollers for controlling a speed ratio of the input and output disks.

Mutually neighboring ends of the roller support members are connected to each other by linkage members to ensure the synchronous movement of the roller support members. Each of the linkage members have a central part pivotally supported by the transmission casing.

The pistons can be fitted into the transmission casing from the outer side of the transmission casing and can be detachably connected to the roller support members in the transmission casing. A linkage support member is provided, which can be inserted into the transmission casing from an end opening of the transmission casing and fixed to the transmission casing, with the linkage support member perpendicular to an axis of the transmission casing. The main shaft is passed through a penetrating hole formed in the linkage support member, and the central parts of the linkage members are pivotally supported by the linkage support member. Then, the input and output disks are tightened in mutually closing directions, thus forming a subassembly of the continuously variable transmission unit, with the pistons constructed to utilize the linkage support member.

The subassembly is inserted in the transmission casing from the end opening of the transmission casing, and is fixed to the transmission casing with the linkage support member perpendicular to the axis of the transmission casing, while the pistons are fitted into the transmission casing from the outer side of the transmission casing, and connected to the roller support members of the subassembly in the transmission casing respectively.

With the continuously variable transmission according to the invention, the friction rollers transmit power between the disks by frictional engagement, and the speed ratio of the input and output disks can be continuously varied due to occurrence of synchronous swings of the friction rollers when the roller support members rotatably supporting the friction rollers are urged by pistons and moved synchronously in directions along their own swinging axes, each of which is perpendicular to a rotating axis of the supporting friction roller. During this changing of the speed ratio, the linkage members function to ensure the synchronous movement of the roller support members, so that accurate controlling of the speed ratio change can be achieved.

Further, with the continuously variable transmission according to the invention, such an assemblage sequence can be adopted with first constructing the subassembly of the continuously variable transmission unit without the pistons. Then, the subassembly is inserted in the transmission casing from the end opening thereof. Thus, above-mentioned assembly avoids an extremely narrow working space in the transmission casing, so that assembling workability of the transmission is advanced, so that automation of transmission assembly can be realized.

Further, with the continuously variable transmission according to the invention, since the linkage support member for supporting each of the linkage members to the transmission casing is an integrated part, sufficient strength of the linkage support member can easily be secured so that when the linkage support member receives great degree of moment for speed ratio change, the linkage support member is hardly deformed. Thus, deterioration of accuracy of controlling the speed ratio change is prevented.

In a preferred embodiment according to the invention, cylinders receiving the pistons are formed on the transmission casing and are integrated with portions of the transmission casing where the linkage support member is to be fixed.

With this embodiment, when assembling the transmission based on the above-mentioned assembling sequence, though the pistons are attached to the subassembly, which is already constructed, deterioration of accuracy of assemblage is prevented because of the integrated formation of the fixing portions of the transmission casing and the cylinders.

In a further preferred embodiment according to the invention, a gearing device for forward drive/reverse drive switching is inserted in the transmission casing from another end opening of the transmission casing, which insertion automatically brings a driving engagement due to fitting between elements for transmitting power between the gearing device and the transmission unit.

With this embodiment, when the continuously variable transmission includes a combination of the transmission unit and the gearing device for forward drive/reverse drive switching, the transmission unit and the gearing device are installed from both ends of the transmission casing, so that above-mentioned advanced workability for transmission assembly can easily be achieved.

BRIEF DESCRIPTION OF THE DRAWING

The present invention will now be explained in further detail by referring two preferred embodiments shown in the accompanying drawings, in which.

DESCRIPTION OF THE PREFERRED EMBODIMENTS

Figure 1:
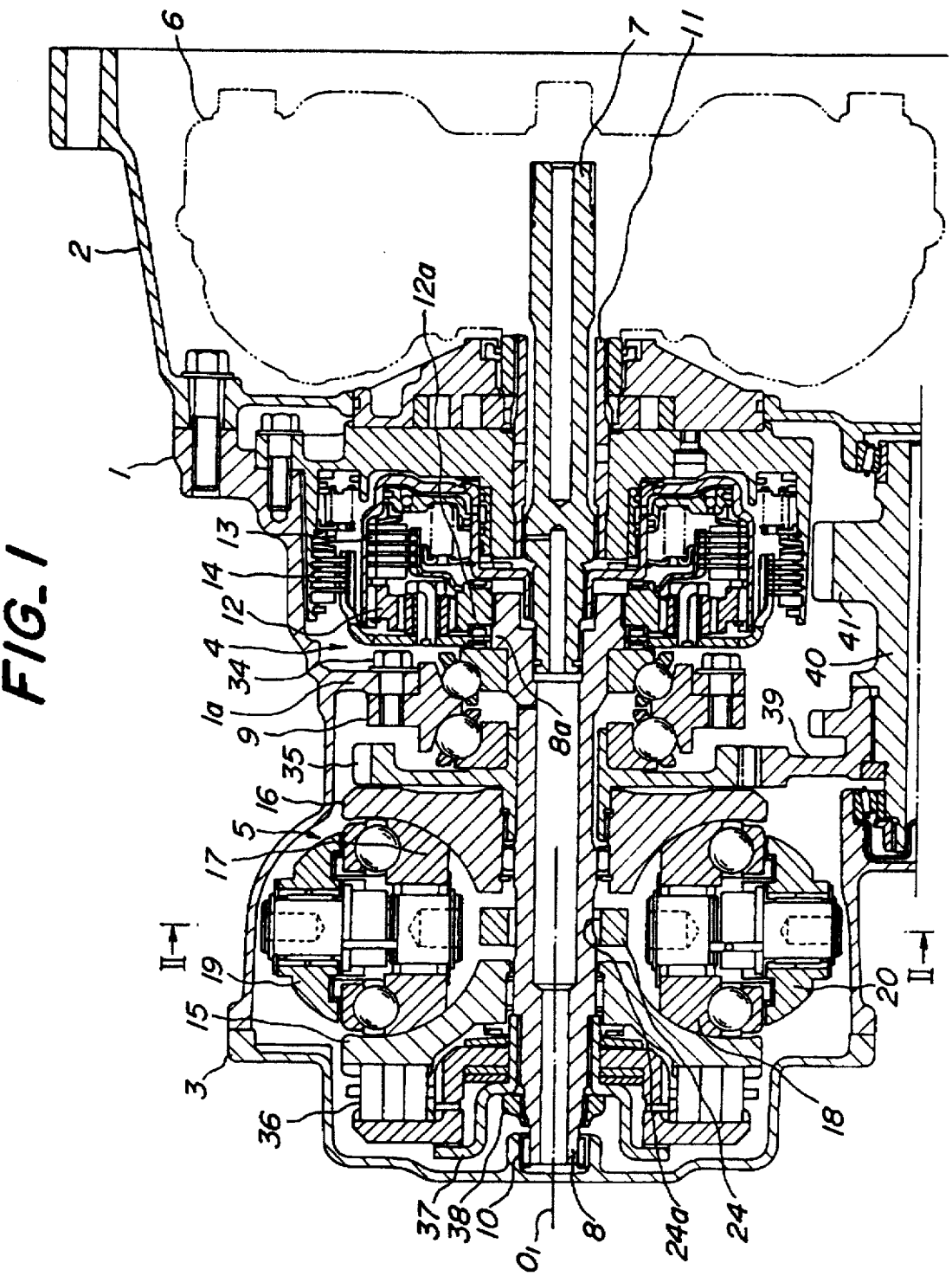
FIG. 1 is a longitudinal sectional view showing an embodiment of the friction-roller-type continuously variable transmission according to the invention.
Figure 2:
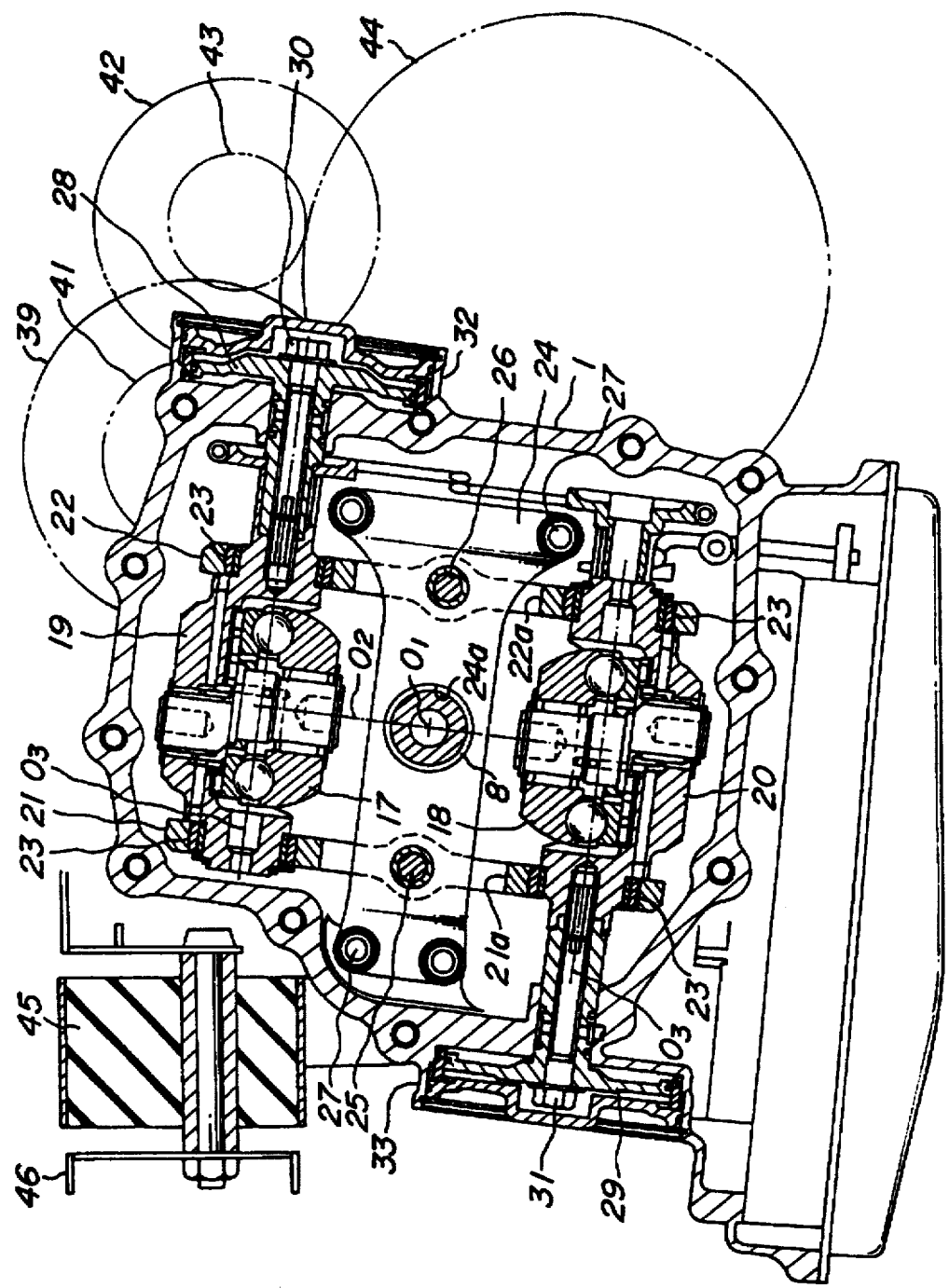
FIG. 2 is a cross sectional view taken on the line II—II in FIG. 1.
Figure 3:
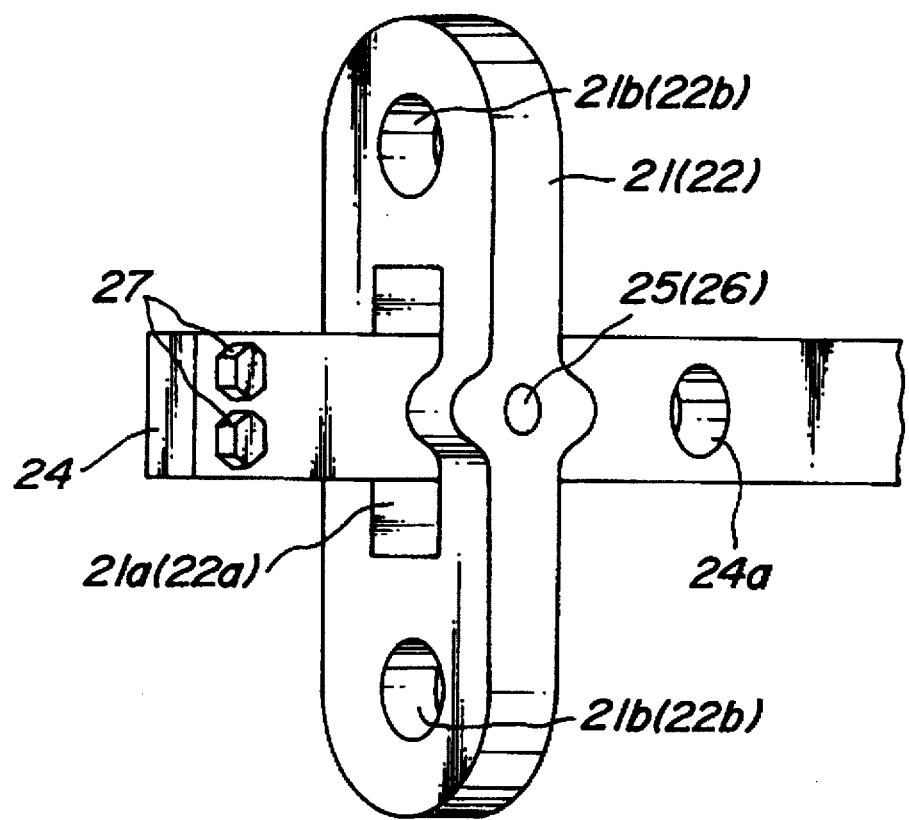
FIG. 3 is an oblique view showing a relation of a linkage support member and linkage members according to the embodiment in FIG. 1.

Referring now to FIG. 1 to FIG. 3, there is shown an embodiment of the friction-roller-type continuously variable transmission according to the invention, which transmission includes a transmission casing 1, a converter housing 2 connected to a front end of the transmission casing 1 having a front end opening, and a rear cover 3 connected to a rear end opening of the transmission casing 1.

In the transmission casing 1, an intermediate wall 1a with a central opening is formed integrally at approximately a longitudinal central portion of the casing 1. Further in the transmission casing 1, a gearing device 4 is contained in front of the intermediate wall 1a for forward drive/reverse drive switching, while a continuously variable transmission unit 5 is contained in rear of the intermediate wall 1a. On the other hand, in the converter housing 2, a torque converter 6 is contained.

The gearing device 4 comprises an input shaft 7 at the center thereof, while the transmission unit 5 comprises a main shaft 8 at the center thereof. The input shaft 7 and main shaft 8 are fitted to each other at their neighboring ends concentrically and rotatably relative to each other. The main shaft 8 is rotatably supported to the transmission casing 1 through a common ball bearing 9 as radial and thrust bearings provided on the intermediate wall 1a and a radial needle bearing 10 provided on the rear cover 3, while the input shaft 7 is rotatably supported to the transmission casing 1 through the fitting end of the main shaft 8 and a hollow shaft 11 connected to the transmission casing 1. The input shaft 7 is drivably engaged to a crankshaft of an engine (not shown) through the torque converter 6 and provides power or driving force from the engine.

The gearing device 4, which is well known per se for forward drive/reverse drive switching, comprises a simple planetary gear mechanism 12, a forward drive clutch 13, and a reverse drive brake 14, wherein rotation of the input shaft 7 is transmitted to the main shaft 8 when the forward drive clutch 13 is actuated and rotation of the input shaft 7 is reversed and transmitted to the main shaft 8 when the reverse drive brake 14 is actuated.

The transmission unit 5, which is constituted as a toroidal type continuously variable transmission unit, comprises an input conical disk 15 and an output conical disk 16, which disks are arranged rotatably and concentrically on the main shaft and opposed to each other, and two power rollers (friction rollers) 17, 18 arranged with mutually same circumferential distances around a common rotating axis $O_1$ of the input and output conical disks 15, 16 so that the power rollers transmit power between the conical disks to which the power rollers are frictionally engaged.

The two power rollers 17, 18 are arranged up and down, and rotatably supported by trunnions (roller support members) 19, 20 respectively. The trunnions 19, 20 are arranged to extend along their own swinging axes $O_3$ as shown in FIG. 2, each of which swinging axes being perpendicular to a rotating axis $O_2$ of corresponding power roller 17, 18. Mutually neighboring ends of the trunnions 19, 20 are mutually connected by a linkage member 21, and mutually neighboring other ends of the trunnions 19, 20 are mutually connected by another linkage member 22, rotatably and obliquely through ball joints 23.

The linkage members 21, 22 have rectangular holes 21a, 22a at central portions thereof as clearly shown in FIG. 3. A common bone shaped linkage support member 24 for the linkage members is inserted through the rectangular holes 21a, 22a. Then, in this condition the central portions of the linkage members 21, 22 are pivotally supported to the linkage support member 24 by pins 25, 26. The linkage support member 24 has a size that enables the linkage support member to be inserted perpendicularly to the axis $O_1$ of the transmission casing 1 as shown in FIG. 2, into the transmission casing 1 from the end opening thereof, and the linkage support member 24 is fixed in the same inserted condition at four corners of the linkage support member to the transmission casing 1 by bolts 27. Thus, the linkage members 21, 22 are pivotally supported indirectly at the central parts thereof to the transmission casing 1, so that pivotings of the linkage members serve to move the trunnions 19, 20 synchronously in relatively reverse directions along the swinging axes $O_3$. The linkage support member 24 further has a circular hole 24a where the main shaft 8 at the central part thereof is inserted. On the other hand, the linkage members 21, 22 have circular holes 21b, 22b for the ball joints 23 at both ends thereof, as shown in FIG. 3.

As clearly shown in FIG. 2, two pistons 28, 29 are abutted against mutually remote ends of the trunnions 19, 20 respectively and connected to the ends of the trunnions 19, 20 concentrically, which connections being provided in the transmission casing 1 and brought by bolts 30, 31. The pistons 28, 29 are fitted slidably in cylinders 32, 33, which are integrally formed on the transmission casing 1 and open to the outside of the transmission casing 1.

As shown in FIG. 1, the common ball bearing 9 (radial and thrust) is held by a step 8a of the main shaft 8 and connected to the intermediate wall 1a by bolts 34. Between the ball bearing 9 and the output conical disk 16, an output gear 35 is provided. The output gear 35 is engaged to the output conical disk 16 by splines and rotatably supported on the main shaft 8. The linkage support member 24 is naturally arranged between the input and output conical disks 15, 16.

A plurality of loading cams 36 are arranged at one side of the input conical disk 15 remote from the output conical disk 16, and are drivably engaged to the main shaft 8 through a drive plate 37 held on the main shaft 8 by a screwed loading nut 38, thereby a subassembly of the continuously variable transmission unit 5 can be tightened between the step 8a and the loading nut 38 for constructing thereof, which subassembly being mentioned below.

The continuously variable transmission according to the embodiment has a first counter shaft 40 provided with a counter gear 39 engaged with the output gear 35, and the first counter shaft 40 is provided with another counter gear 41 integrally formed thereon. As shown in FIG. 2, a gear 42 engaged with the counter gear 41, and a gear 43 positioned concentric to the gear 42 are integrally formed on a second counter shaft (not shown). The gear 43 is engaged with a drive ring gear 44 of a differential gearing (not shown).

The above-mentioned friction-roller-type continuously variable transmission according to the embodiment is applied, for example, automobiles or the like, by mounting the transmission to a vehicle body 46 through a plurality of mounting brackets 45, one of which is shown in FIG. 2. The continuously variable transmission functions as follows.

Referring to FIG. 1, rotation transmitted from the torque converter 6 is transferred to the main shaft 8 or reversely through the gearing device 4. The rotation of the main shaft 8 is transmitted to the input conical disk 15 through the drive plate 37 and loading cams 36. Then the rotation of the input conical disk 15 is brought to the output conical disk 16 by rotation of the power rollers 17, 18 about their rotating axis $O_2$. During the transmission of rotation, the loading cams 36 produce thrust force corresponding to a transmitting torque, thereby urging the input conical disk 15 toward the output conical disk 16. Thus, the loading cams 36 ensure frictional engagement between the input and output conical disks 15, 16, and enable the transmission of rotation. The rotation of the output conical disk 16 is transmitted to the differential gearing (not shown) sequentially through the gears 35, 39, 41, 42, 43 and 44.

Referring to FIG. 2, when controlling a variation of a speed ratio of the input and output conical disks 15, 16 in changing the speed ratio of the disks and hence the transmission, the trunnions 19, 20 are moved in the same phase synchronously by the pistons 28, 29 to the directions along the swinging axes $O_3$. Accordingly, the power rollers 17, 18 are offset from the rotating axis $O_1$ of the input and output conical disks and are given a component force about the swinging axes $O_3$ so that the power rollers 17, 18 are swung about the axes $O_3$. The swings of the power rollers 17, 18 give rise to a continuous variation of diameters of frictionally engaging circles of the input and output conical disks 15, 16 with the power rollers 17, 18, which variation causes a continuous variation of the speed ratio of the input and output conical disks 15, 16 and hence the speed ratio of the transmission. When the speed ratio of the transmission reaches a desired ratio, the pistons 28, 29 return the power rollers 17, 18 to positions where no offset from the rotating axis $O_1$ is present, by moving back the trunnions 19, 20 due to a well known feedback control, so that the desired speed ratio of the transmission is maintained.

Figure 4:
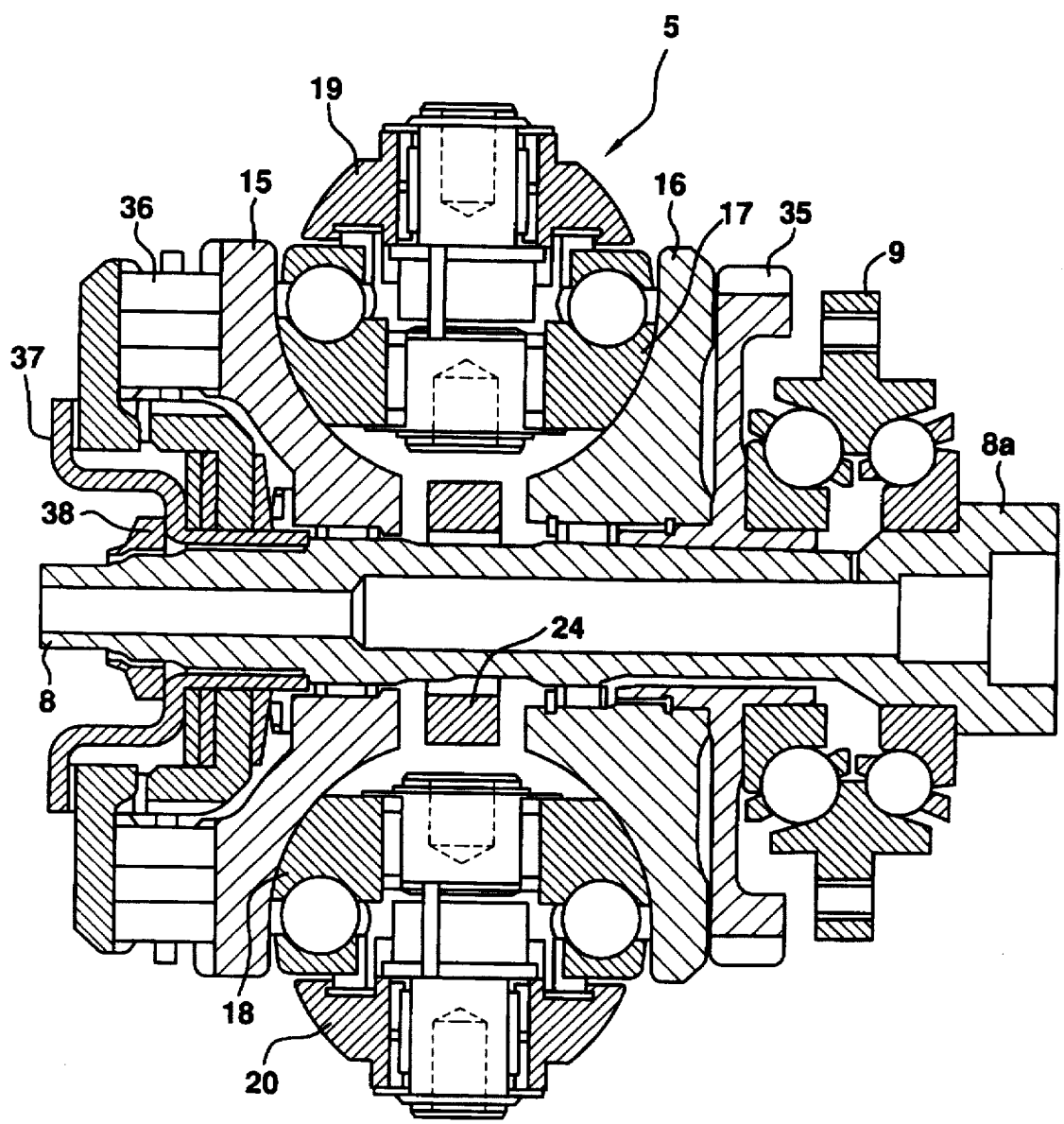
FIG. 4 is a longitudinal sectional view showing a subassembly of a continuously variable transmission unit according to the embodiment in FIG. 1.
Figure 5:
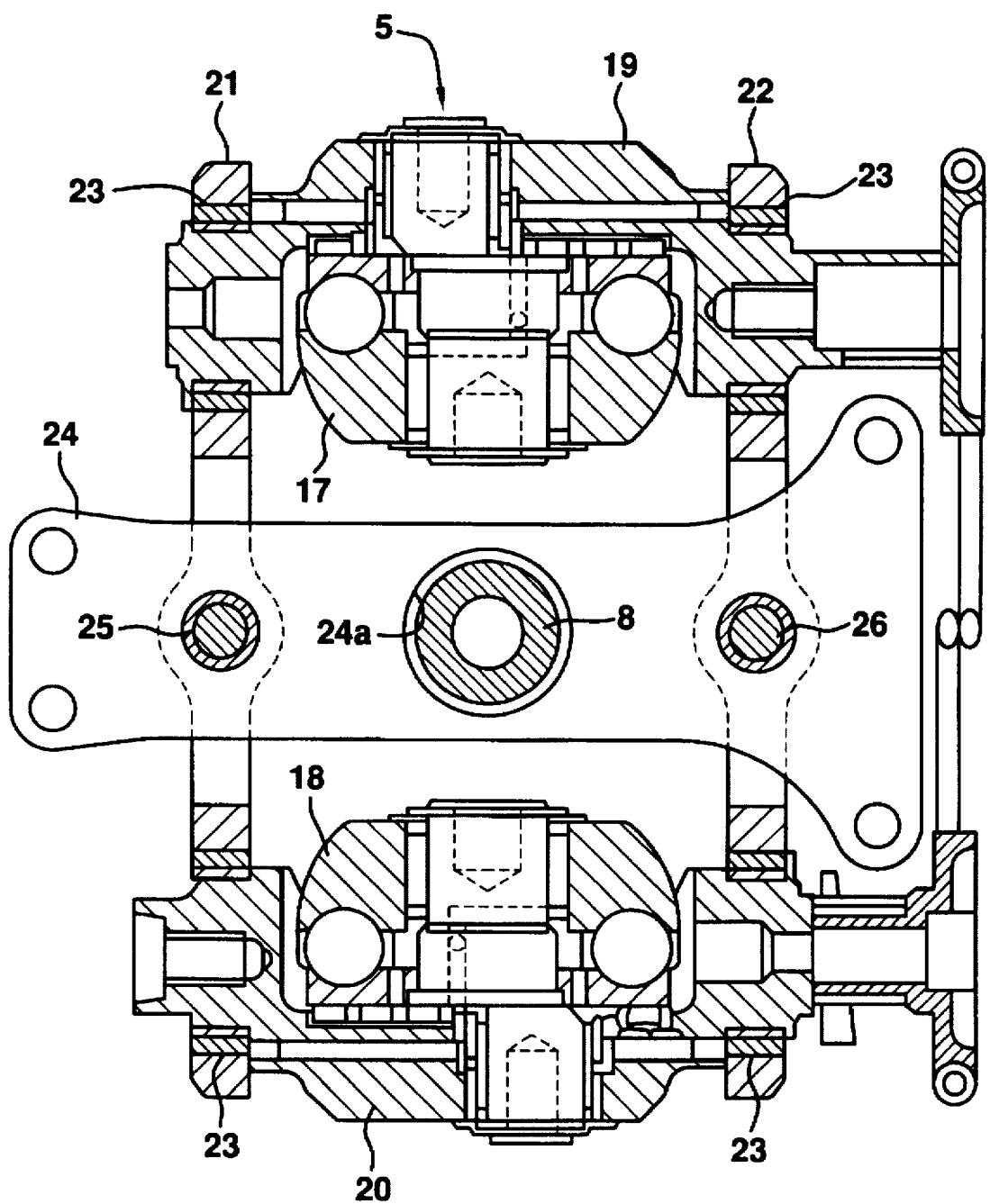
FIG. 5 is a cross sectional view showing the subassembly of the continuously variable transmission unit according to the embodiment in FIG. 1.

Next, an assembling sequence of the friction-roller-type continuously variable transmission according to the embodiment is explained. When assembling the transmission, first the transmission unit 5 without the pistons 28, 29 shown in FIG. 2 is assembled as shown in FIG. 4 and FIG. 5. That is, the ball bearing 9, the output gear 35 and the output conical disk 16 are fitted onto the main shaft 8 and transported toward the step 8a sequentially. Then, an assembled unit consisting of the power rollers 17, 18, the trunnions 19, 20, the linkage members 21, 22 and the linkage support member 24 is fitted onto the main shaft 8. Thereafter, the input conical disk 15, the loading cams 36 and the drive plate 37 are sequentially fitted onto the main shaft 8. Finally, the loading nut 38 is tightly screwed on the main shaft 8, tightening the above-mentioned components. Thus, a subassembly of the transmission unit 5 without the pistons 28, 29 is constructed.

The constructed subassembly of the transmission unit 5 shown in FIG. 4 and FIG. 5 is inserted in the transmission casing 1 from the end opening of the transmission casing, with the subassembly perpendicular to the axis $O_1$ of the transmission casing 1, as shown in FIG. 2. Then, the ball bearing 9 is abutted against the intermediate wall 1a of the transmission casing 1 and fixed to the intermediate wall 1a by bolts 34, as shown in FIG. 1.

Subsequently, the linkage support member 24 is fixed at their four corners to the transmission casing 1 by bolts 27. Then, the main shaft 8 is supported to the transmission casing 1 through the bearing 10 as the rear end opening is closed by the rear cover 3.

Subsequently, the pistons 28, 29 are fitted into the cylinders 32, 33 from the outer side of the transmission casing 1, and abutted against the ends of the corresponding trunnions 19, 20. Then, the pistons 28, 29 are connected to the ends of the trunnions 19, 20 by bolts 30, 31 respectively.

Further, the gearing device 4 for forward drive/reverse drive switching is inserted in the transmission casing 1 from the front end opening of the transmission casing 1, causing automatic engagement of a sun gear 12a as an output element of the planetary gear mechanism 12 of the gearing device 4 to the main shaft 8 as an input element of the continuously variable transmission unit 5 through splines. During the insertion of the gearing device 4, the above-mentioned neighboring end of the input shaft 7 is fitted into an axial hole of the other neighboring end of the main shaft 8.

Thus, the friction-roller-type continuously variable transmission according to the embodiment enables to adopt such an assembling sequence where the subassembly of the continuously variable transmission unit 5 without the pistons 28, 29 is first constructed. Then, the subassembly is inserted in the transmission casing 1 from the rear end opening thereof. Thereafter, the pistons 28, 29 are fitted from the outer side of the transmission casing 1 and connected to the ends of the trunnions 19, 20. Therefore, with the transmission according to the embodiment, assembling work in an extremely narrow working space in the transmission casing is completely excluded, so that not only workability for assembling the transmission is advanced, but also automation of transmission assembly can be realized.

Further, with the transmission according to the embodiment, since the linkage support member 24 for supporting each of the linkage members 21, 22 to the transmission casing 1 is an integrated part, sufficient strength of the linkage support member 24 can easily be secured, so that when the linkage support member 24 receives great degree of moment for speed ratio change, the linkage support member 24 is hardly deformed. Thus, deterioration of accuracy of controlling the speed ratio change is prevented.

Further, with the transmission according to the embodiment, since the cylinders 32, 33 wherein the pistons are to be fitted are formed on the transmission casing 1 and integrated with the portions of the transmission casing 1 where the linkage support member 24 is to be fixed, though the pistons 28, 29 are fitted into the cylinders after attaching the subassembly to the transmission casing 1, the pistons 28, 29 can be abutted accurately against the trunnions 19, 20, thus preventing deterioration of accuracy of assemblage.

Further, with the transmission according to the embodiment, since the continuously variable transmission unit 5 is inserted from the rear end opening of the transmission casing 1 and the gearing device 4 for forward drive/reverse drive switching is inserted from the front end opening of the transmission casing 1, causing automatic engagement through splines, between the sun gear 12a and the main shaft 8, which transmit power between the gearing device 4 and the continuously variable transmission unit 5. When a continuously variable transmission includes a combination of the transmission unit 5 and the gearing device 4 for forward drive/reverse drive switching, the transmission unit 5 and the gearing device 4 are installed from both ends of the transmission casing 1, so that above-mentioned advanced workability for assembling the transmission can easily be maintained.

Though the transmission of the above-mentioned embodiment is provided with two power rollers 17, 18, in a case where a continuously variable transmission is provided with three power rollers, a constitution of the transmission that enables to achieve similar actions and effects can be provided based on a similar point of view according to the present invention, as explained below.

Figure 6:
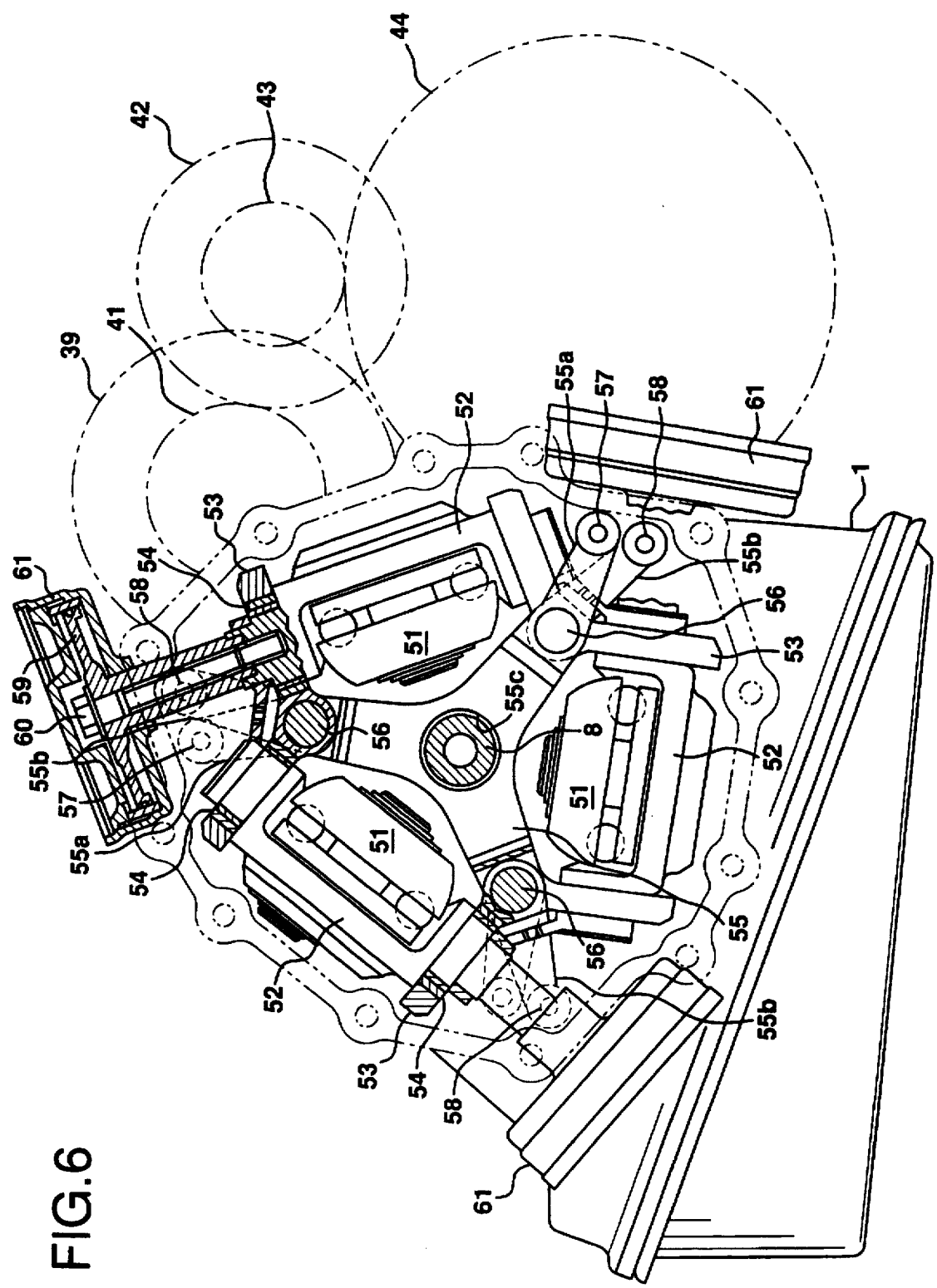
FIG. 6 is a cross sectional view taken similar to FIG. 2 showing another embodiment of the friction-roller-type continuously variable transmission according to the invention.
Figure 7:
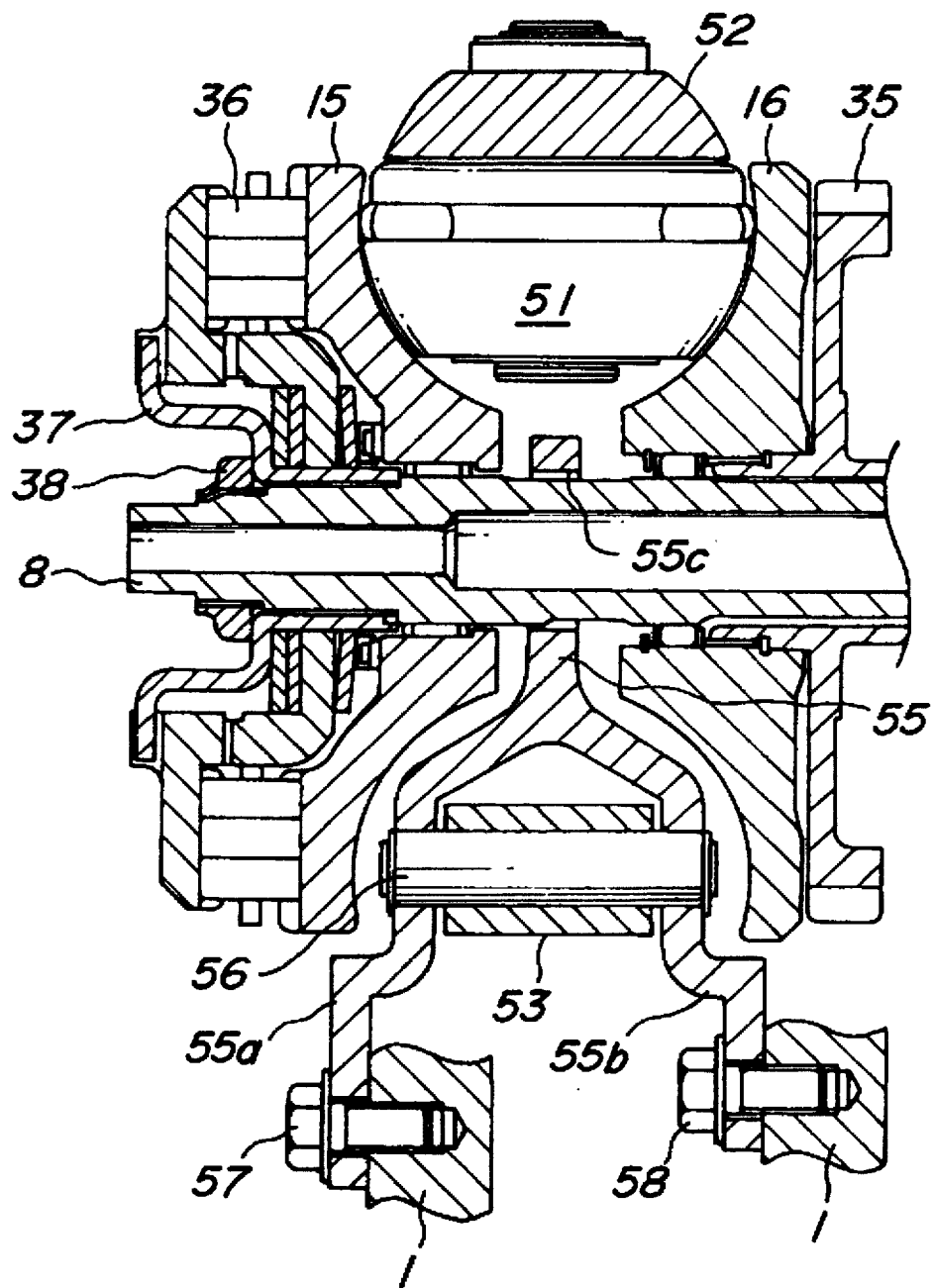
FIG. 7 is a longitudinal sectional view showing detail of a fixing construction of a linkage support member to a transmission casing according to the embodiment of FIG. 6.

FIG. 6 and FIG. 7 show another embodiment of the friction-roller-type continuously variable transmission according to the invention, wherein parts similar to that in the former embodiment are referenced with the same reference numerals as that in the former embodiment. In the transmission shown in FIG. 6 and FIG. 7, between input and output conical disks 15, 16, three power rollers 51 are arranged so as to transmit power between the input and output conical disks 15, 16 individually. The three power rollers 51 are arranged with mutually same circumferential distances around an axis of a main shaft 8, directing their rotating axes toward the axis of the main shaft 8, and rotatably supported by trunnions 52 respectively.

As shown in FIG. 6, the trunnions 52 extend along their own swinging axes, each of which is perpendicular to a rotating axis of corresponding power roller. Mutually neighboring ends of the three trunnions 51 are mutually connected by L shaped linkage members 53 rotatably and obliquely through ball joints 54. The linkage members 53 are each pivotally supported at a central portion thereof to an intermediate portion of a corresponding arm of a common star shaped linkage support member 55 by a pin 56, which linkage support member 55 having a size that enables the linkage support member to be inserted in a transmission casing 1, with the linkage support member perpendicular to an axis of the transmission casing 1. To achieve this, a portion from approximately a center to an end of each of the arms of the linkage support member 55 is formed into a forked shape having two legs 55a, 55b as shown in FIG. 7, between which legs the linkage member 53 is pivotally supported by the pin 56.

The linkage support member 55 is formed with a circular hole 55c to be inserted the main shaft 8, to enable construction of a subassembly of a continuously variable transmission unit similar to the former embodiment, and the linkage support member 55 is fixed to the transmission casing 1 at ends of the two legs 55a, 55b of each of the arms by bolts 57, 58, so as to be attached to the transmission casing 1.

Further in the transmission according to the latter embodiment, as clearly shown in FIG. 6, three pistons 59 are respectively abutted against mutually remote ends of the trunnions 52 and connected to the ends of the trunnions 52, which connections being provided in the transmission casing 1 and maintained by bolts 60. The pistons 59 are slidably seated in cylinders 61, which are integrally formed on the transmission casing 1 and open to the outside of the transmission casing 1.

Thus, where the continuously variable transmission is provided with three power rollers 51, the transmission according to the latter embodiment enables to adopt such an assembling sequence where the subassembly of the continuously variable transmission unit without the pistons 59 is first constructed. Then, the subassembly is inserted in the transmission casing 1, in a direction along the axis of the transmission casing 1, and fixed to the transmission casing 1. Thereafter, the pistons 59 are fitted from the outer side of the transmission casing 1 and connected to the trunnions 52, similar to the former embodiment. Therefore, with the transmission according to the latter embodiment, assembling work in an extremely narrow working space in the transmission casing 1 is completely eliminated, so that not only workability for assembling the transmission is advanced, but also automation of transmission assembly can be realized.

Further, with the transmission according to the latter embodiment, since the linkage support member 55 for supporting three linkage members 53 to the transmission casing 1 is an integrated part, sufficient strength of the linkage support member 55 can easily be secured, so that when the linkage support member 55 receives great degree of moment for speed ratio change, the linkage support member 55 is hardly deformed. Thus, deterioration of accuracy of controlling the speed ratio change is prevented.

Further, with the transmission according to the embodiment, since the cylinders 61 (with the pistons 59 inserted therein) are formed on the transmission casing 1 and integrated with the portions of the transmission casing 1 where the linkage support member 55 is to be fixed, although the pistons 59 are fitted into the cylinders after attaching the subassembly to the transmission casing 1, the pistons 59 can be abutted accurately against the trunnions 52, so that deterioration of accuracy of assembling is prevented.

The foregoing description is by way example only, and not intended to limit the scope of the appended claims.

I claim:

1. A friction-roller-type continuously variable transmission comprising:

a continuously variable transmission unit and a transmission casing containing the continuously variable transmission unit, the transmission casing having a first opening at one end thereof, wherein the continuously variable transmission unit has a subassembly comprising:

a main shaft;

an input disk and an output disk each provided on the main shaft and opposed to each other;

a plurality of friction rollers arranged around the main shaft and positioned between the input and output disks for transmitting power and changing rotational speed between the input and output disks by a continuously variable ratio;

a disk tightening means for tightening the input and output disks toward mutually closing directions so that the input and output disks are frictionally engaged with the friction rollers;

a plurality of roller support members each rotatably supporting one of the friction rollers about a rotating axis of the friction roller;

a plurality of linkage members each supporting mutually neighboring ends of two of the roller support members so that the two roller support members are connected to each other while each of the roller support members is swingable about a swinging axis perpendicular to the rotating axis of the corresponding friction roller;

a single linkage support member for fixing the continuously variable transmission unit to the transmission casing, wherein the single linkage support member extends perpendicularly to an axis of the main shaft and has a central through-hole occupied by the main shaft, the single linkage support member pivotally supporting a central part of each of the linkage members so that the roller support members are axially and synchronously moved along the swinging axes to synchronously swing the roller support members and hence the friction rollers for ensuring a variation of speed ratio between the input and output disks, wherein the single linkage support member has an extent smaller than a width of the first opening end of the transmission casing with respect to an axial direction of the main shaft placed therein, and the single linkage support member is fixed at ends thereof to inside of the transmission casing, and wherein the transmission casing is provided with a plurality of cylinders having a plurality of pistons therein respectively, each of the cylinders and the pistons being positioned on the swinging axis of one of the roller support members and each of the cylinders having an end opened to the outside of the transmission casing;

piston connecting bolts for directly connecting the pistons respectively to the roller support members to force the roller support members to move axially and integrally with the pistons to swing the friction rollers, wherein the piston connecting bolts respectively penetrate the pistons from the outside of the transmission casing and are screwed into the roller support members so that the pistons are directly connected to the roller support members at inside of the transmission casing.

2. A friction-roller type continuously variable transmission according to claim 1, wherein the cylinders are formed intergrally with the transmission casing.

3. A friction-roller-type continuously variable transmission according to claim 1, wherein the continuously variable transmission further comprises a gearing device for forward drive/reverse drive switching and a second opening at the opposite end of the first opening of the transmission casing, the gearing device being inserted in the axial direction of main shaft and positioned into the transmission casing through the second opening of the transmission casing and drivingly engaged with the continuously variable transmission unit through elements for transmitting power between the gearing device and the transmission unit, which elements being fitted to each other by insertion of the gearing device in the axial direction of main shaft.

4. A friction-roller-type continuously variable transmission according to claim 1, wherein the plurality of friction rollers are two power rollers, and the single linkage support member has an elongated I-shape with wider longitudinal ends.

5. A friction-roller-type continuously variable transmission according to claim 1, wherein the plurality of friction rollers are three power rollers, and the single linkage support member has a star-shape with radially extending three arms.

* * * * *